Oct. 4, 1966   I. G. DUNCAN   3,276,282
TENSIONING DEVICES
Filed Dec. 26, 1963   3 Sheets-Sheet 1

Inventor:
Ian G. Duncan
By: Evan D. Roberts  Atty.

Inventor:
Ian G. Duncan
By: Evan D. Roberts Atty.

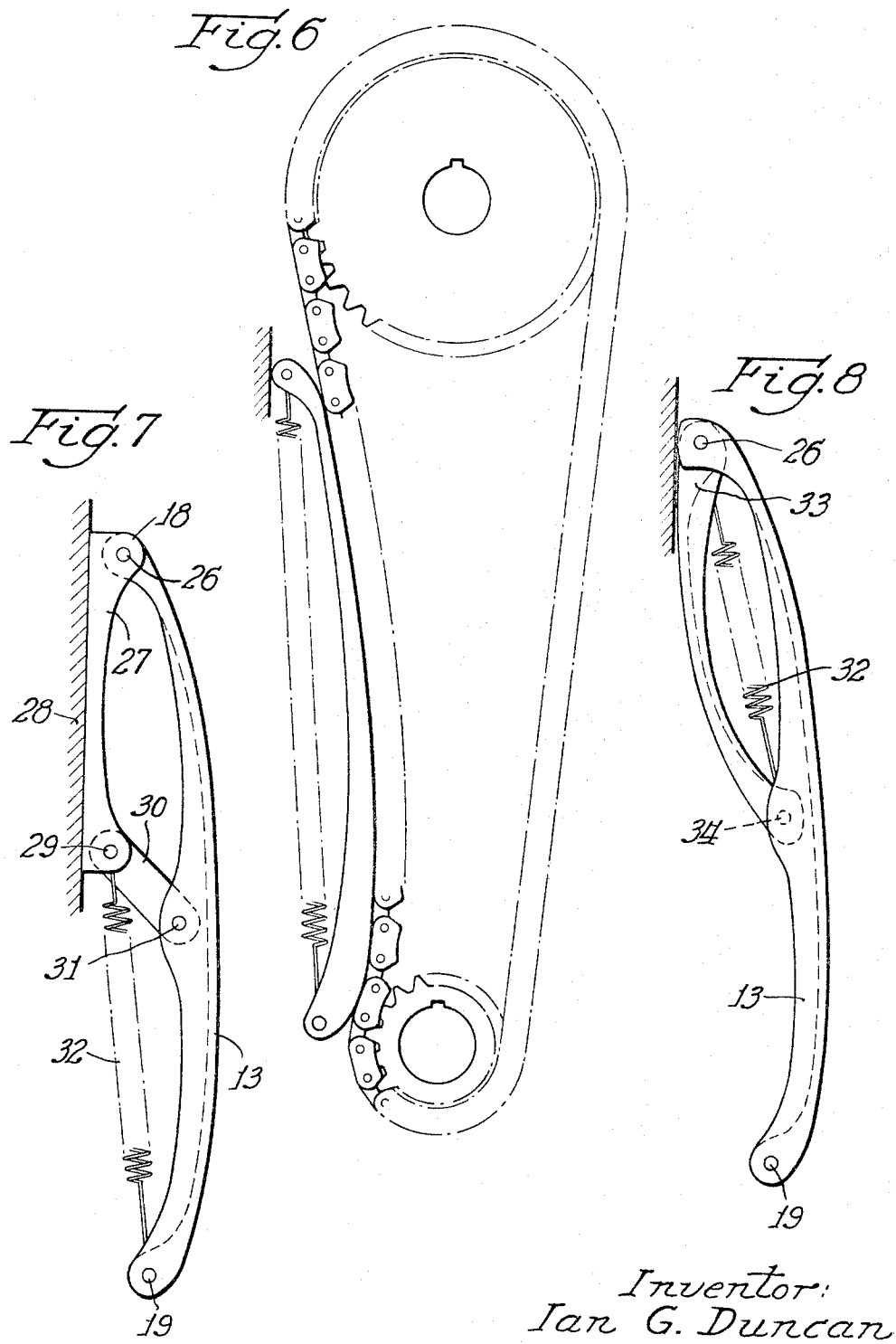

United States Patent Office 3,276,282
Patented Oct. 4, 1966

3,276,282
TENSIONING DEVICES
Ian Gair Duncan, Hertfordshire, England, assignor to Morse Chain Company, Ithaca, N.Y., a corporation of New York
Filed Dec. 26, 1963, Ser. No. 333,288
9 Claims. (Cl. 74—242.11)

This invention relates to tensioning devices for driving chains, of all types: e.g. roller chains and inverted tooth chains.

The invention relates especially but not exclusively to cam shaft drives which are subjected to severe torque variations.

The invention relates particularly to tensioning devices of the kind comprising a blade or strip having approximately the width of the chain and adapted to be attached at one end, usually but not necessarily the end adjacent the driving sprocket, to a fixed fulcrum, the other end constituting a floating fulcrum which rests against a guide, and a tension spring extending between the fulcrums or between the sliding fulcrum and some point along the length of the blade or strip.

In tensioning devices of the kind referred to it is known to make the blade or strip of spring steel on which is affixed, e.g. by bonding, or moulding, or riveting, a covering of synthetic rubber or other synthetic plastics material. Disadvantages of this known construction are that if the spring steel blade is made relatively thin, say about .04" thick, it flexes too easily and in use has inadequate resistance against the tendency of the chain to "snake" as the slack strand leaves the driving sprocket. If the thickness of the blade is increased to say .080" or more the strength of the tension spring has to be increased very considerably to such an extent that the spring rate becomes high and the near constant load between the tensioning device and the chain is lost.

The object of the invention is to overcome these disadvantages.

With the above object in view a tensioning device of the kind referred to made in accordance with the present invention is characterised in that the blade or strip is made of synthetic plastics material.

The term "synthetic plastics material" used herein includes synthetic plastics material incorporating a filling or reinforcing material such as commonly used in such plastic materials.

The blade or strip may be made entirely from a homogenous synthetic plastics material but if desired a facing of softer material may be bonded to its working surface. For example the blade or strip may be made from hard synthetic plastics material such as nylon and have bonded to its working surface a facing of softer synthetic rubber.

In the accompanying drawings which illustrate how the invention may be carried into effect:

FIGS. 6 to 8 illustrate various modifications of the tensioning device.

Figure 1:
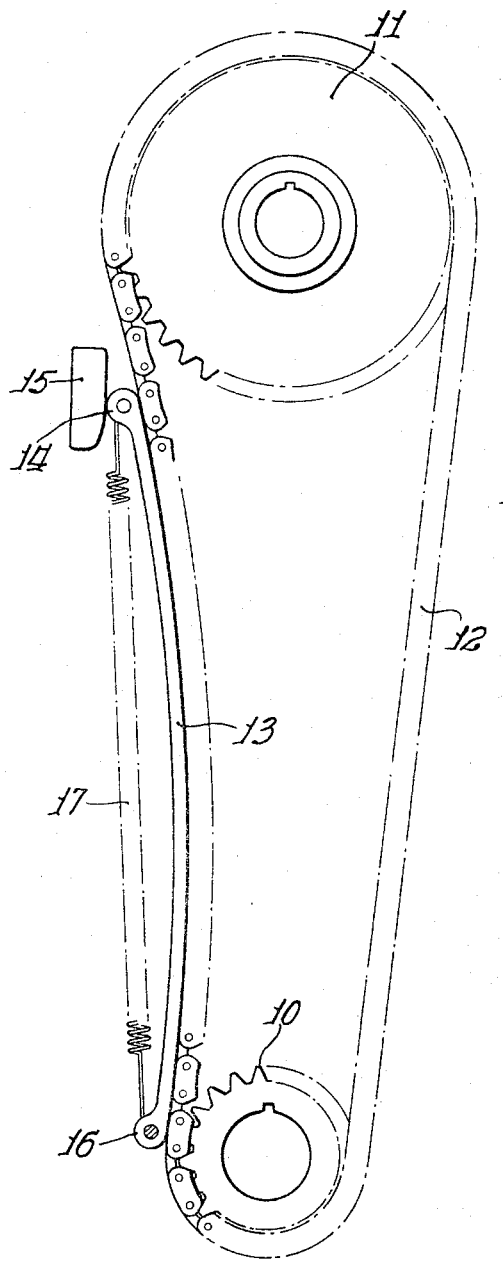
FIG. 1 illustrates a camshaft chain drive fitted with a tensioning device according to the invention.

In FIG. 1, 10 denotes the driving sprocket, 11 the camshaft sprocket, and 12 the driving chain between the two sprockets. The tensioning device comprises a blade or strip 13 having a sliding fulcrum end 14 resting on a guide 15 and a fixed fulcrum end 16 which is usually, as shown in the figure, but not necessarily, adjacent to the driving sprocket 10. A tension spring 17 extends between and is attached to the two ends of the blade or strip 13. In the present embodiment the blade or strip 13 is made of nylon or hard synthetic rubber. Both these materials provide considerable internal damping and since they have a considerably lower modulus than steel quite thick sections can be used for the blade or strip without recourse to excessive loading from the tension spring.

An advantage obtained by making the blade or strip 13 of nylon or synthetic rubber is that these materials "creep" when subjected to a continuous stress. This creep would normally be accentuated by the elevated temperature in an engine with which the tensioning device is associated. Thus whatever the degree of slackness in the chain, the tensioner will quickly take a permanent set to conform to the natural radius of the slack strand of the chain and will thus have greater resistance against "snake." This avoids the requirement for a heavy load between the blade and the chain.

In the embodiment shown in FIG. 1 the fulcrum ends 14, 16 of the blade or strip are rounded and between these rounded ends, the blade or strip is of uniform thickness. In the embodiment shown in FIG. 2 the parts 18, 19 of the blade or strip immediately adjacent to the rounded ends are thicker than, and taper progressively towards, the central part 20 intermediate these thickened ends. The greater thickness thus provided adjacent the ends of the blade or strip is an insurance against possible collapse of the strip under the relatively high local stresses across the ends.

Figure 4:
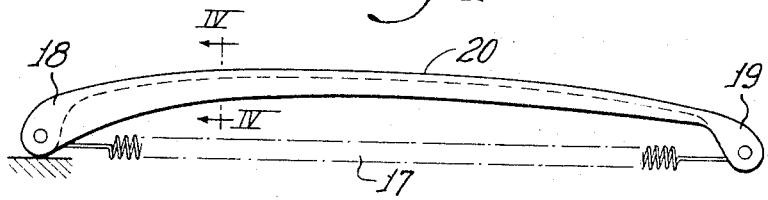
Figure 4A:
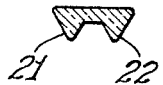
FIG. 4A is a cross section taken along the line IV—IV, FIG. 4.

In some cases it may be required to reduce as much as possible the maximum inward movement of the driving chain due to elongation to provide as much space as possible between the two strands of a timing chain drive. An embodiment of the invention which complies with this requirement is illustrated in FIGS. 4 and 4A. As shown in these figures the blade or strip is radiused immediately adjacent the ends on the side adjacent the spring 17 as shown at 23, 24 to reduce the thickness at these places, the thickness then increasing from these radiused parts towards the central part of the blade. This shaping of the blade or strip provides a comparatively flat curved contour between the ends 18, 19 and reduces to a minimum the inward movement of the slack side of the chain. The blade or strip can be of channel shape or T-shape in cross section a channel section being shown in FIG. 4A, the variation in stiffness along the length of the blade being obtained by varying the thickness or depth of the side ribs 21, 22.

Figure 2:
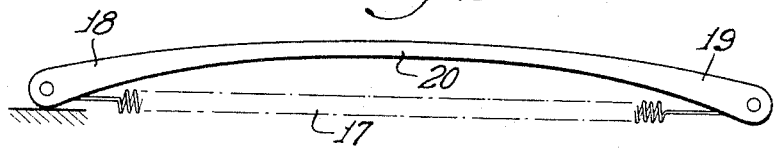
FIGS. 2, 3 and 4 illustrate respectively alternative shapes for the tensioner blade.
Figure 5:
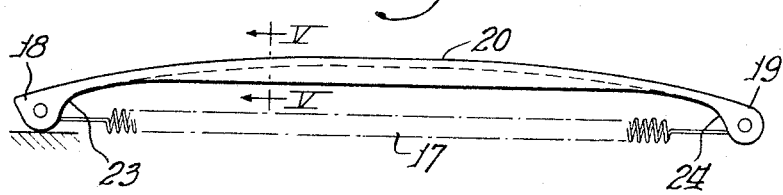
FIG. 5 illustrates another shape for the tensioner blade.
Figure 5A:
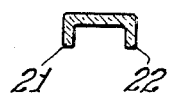
FIG. 5A is a cross section on line V—V, FIG. 5.

The tendency for a driving chain to "snake" is much more pronounced immediately after the "slack" side leaves the driving sprocket, and if this "snake" can be prevented from developing at this point there is much less difficulty in controlling flutter of the remainder of the slack strand. For this reason it is desirable to make the blade or strip comparatively rigid at the end close to the driving sprocket and to reduce the rigidity further up the run of the strip. This provides, in effect, a rigid snubber at the end close to the driving sprocket, which is continued as a flexible tensioner as the blade approaches the driven sprocket. FIGURE 4 is a modification of FIGURE 2 showing how this effect can be easily achieved by varying the thickness of the section along the length 20 of the blade or strip. This thickness, as shown in FIGURE 4, is progressively decreased from the end 19, which will be adjacent to the driving sprocket 10, to the end 18 which will be adjacent to the driven sprocket. In order to save material the blade or strip could be formed with one or more ribs, the thickness of which progressively decreases from the tapered end 19 to the tapered end 18. Such a construction is illustrated in FIGS. 5 and 5A in which the blade or strip is of channel shape in cross section having two ribs 21, 22. In a modification (not illustrated) the blade or strip is of T-shape in cross section.

In the case of a roller chain (but not of an inverted tooth chain), it is well known that the chain tends to cling to the driving sprocket as it leaves the sprocket on the slack strand. It has been found that the elimination of flutter in the slack strand is made easier if the shape of the "snubber" end of the tensioner (i.e. at the driving sprocket end) is shaped as shown in FIG. 6 to conform to the natural curvature of the chain as it clings to the sprocket.

The simple type of tensioner described heretofore is very effective in controlling chain drives with relatively short centres but in the case of long centre drives, especially if these are subjected to high instantaneous loads, it is sometimes impossible to obtain complete control of the chain with this simple type of device. In such cases it has been found effective to provide a "steady" for the tensioner i.e. a device which applies a restraining load to the blade or strip part of the way between the fixed fulcrum and the floating fulcrum. This procedure is not novel in itself and in the known art a "steady" has been provided by means of a follow-up device such as a roller and ramp, a ratchet, or a cam.

Figure 3:
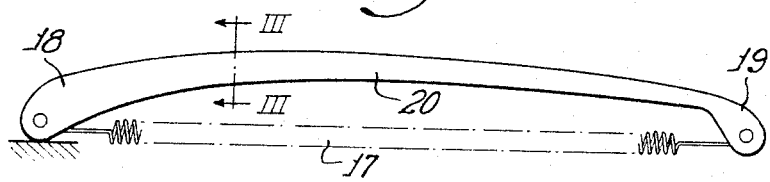

The invention provides a novel "steady" device which operates in a simpler and more effective manner than known devices of this kind. In FIG. 7 which illustrates one embodiment of the novel "steady" device, the blade or strip takes the same general form as shown in FIGS. 3 and 4. The fixed fulcrum 19 is adjacent to the driving sprocket. Instead of the floating fulcrum 18 resting directly on a fixed guide, as described heretofore, it is attached by means of a pin joint 26 to a sliding strut 27 which, in its turn, slides on a fixed slide 28. At the other end of the sliding strut there is another pin joint 29 connecting this strut to one end of a further strut 30. The other end of strut 30 is, in its turn, attached by means of a further pin joint 31 to the main blade or strip 13 intermediate its ends. A tension spring 32 is attached at one end to the fixed fulcrum 19 or to some adjacent fixed point. The other end of the tension spring is attached either to the pin joint 29, as shown in the figure or to the pin joint 26 or to any point along the length of this sliding strut 27.

The two struts 27, 30 can be made of any suitable material e.g. steel, but the preferred material is a synthetic plastics material. By selecting a synthetic plastics material for the sliding strut 27 which has a high coefficient of friction, a considerable degree of damping can be built into the system. This friction damping from the sliding strut 27, combined with the natural hysteresis of the main plastic blade or strip, provides a system with great inherent ability to damp out vibration. For this reason the tensioner is outstandingly successful in providing control for the chain.

In order to simplify production, it is possible to produce the struts 27 and 30 as a single piece moulding in synthetic plastics material as shown in FIG. 8. In this case a flexible strut 33 is pivoted to the main blade or strip 13 as before at the sliding fulcrum 26. The other end of the strut can either be pivoted in a position part way along the main blade or strip as shown at 34 in FIG. 8 or the pivot can be omitted to let the end of the flexible strut slide on the blade or strip 13. With this construction the tension spring 32 extends between the two ends of the flexible strut 33.

In FIGS. 7 and 8 the blade or strip 13 can be of T-shape in cross section or of channel shape as shown in FIGS. 4A and 5A.

In all cases the tension spring may be strong enough to urge the ends of the blade or strip towards one another to maintain an arcuate shape but this is not essential as it has been found that a much weaker spring is sufficient to urge the blade or strip to "creep" and thus to follow up and maintain contact with the chain as it stretches due to elongation.

The blades or strips shown in the drawings are made entirely from a hard homogeneous synthetic plastics material such as nylon. In all cases the working surface of the blade or strip may have bonded thereto a facing or softer material, such as synthetic rubber, for the purpose of reducing any noise which may be caused by rubbing between the contacting surfaces of the chain and the tensioner.

In all cases the position of the fixed fulcrum is dictated by the design of the engine. When the fixed fulcrum is in an inaccessible position the blade or strip of the tensioning device may be extended by a metal strip containing the fixed fulcrum. In this case the metal strip may be moulded in the end of the blade or strip so as to form an integral extension thereof.

I claim:

1. A tensioning device for a driving chain comprising a blade having a width substantially equal to the width of the chain and attached at one end to a fixed fulcrum, the other end of said blade being a floating fulcrum resting against a guide, and a tensioning spring interconnecting the floating fulcrum and said blade at some point intermediate the ends of said blade, said blade being made of synthetic plastics material having a high coefficient of friction to dampen vibration thereof and the ends thicker than the central portion thereof, and the body of said blade tapering along the length thereof.

2. A tensioning device according to claim 1, wherein the ends of the blade are rounded and the parts of the blade immediately adjacent to these rounded ends are thicker than and taper progressively towards the central part of the blade.

3. A tensioning device according to claim 1, wherein the blade is formed with a rib having a thickness progressively decreasing from the end adjacent to the driving sprocket to the other end thereof.

4. A tensioning device according to claim 1, wherein the thickness of the blade is progressively decreased from the end adjacent to the driving sprocket to the other end thereof.

5. A tensioning device according to claim 4, wherein the blade is of channel shape in cross section, the variation in thickness along the length of the blade being obtained by varying the depth of the sides of the channel.

6. A tensioning device for a driving chain comprising a blade having a width substantially equal to the width of the chain and attached at one end to a fixed fulcrum, the other end of said blade being a floating fulcrum resting against a guide, a strut slideable on said guide and having one end thereof pivotally attached to said floating fulcrum and the other end thereof pivotally attached to said blade intermediate of the ends thereof, and a tension spring attached at one end to the blade adjacent the fixed fulcrum and at the other end to said sliding strut.

7. A tensioning device according to claim 6, wherein one end of said sliding strut is pivotally connected to said blade adjacent to the floating fulcrum and the other end of said sliding strut being arranged to slide on said guide.

8. A tensioning device according to claim 6; wherein said sliding strut is connected to said blade by pin joints.

9. A tensioning device according to claim 8, wherein said sliding strut comprises two parts connected together by a pin joint.

References Cited by the Examiner

UNITED STATES PATENTS

| 1,666,882 | 4/1928 | Weller | 74—242.11 |
|---|---|---|---|
| 1,777,527 | 10/1930 | Morse | 74—242.11 |
| 2,129,107 | 9/1938 | Taylor | 74—242.11 |
| 2,141,118 | 12/1938 | Weller | 74—242.11 |
| 2,210,276 | 8/1940 | Bremer | 74—242.11 |
| 2,261,316 | 11/1941 | Weller | 74—242.11 |
| 2,963,918 | 12/1960 | Blakstad | 74—242.8 |

FOREIGN PATENTS 289,989  5/1928  Great Brtiain.

DAVID J. WILLIAMOWSKY, *Primary Examiner.*

DON A. WAITE, *Examiner.*

J. A. WONG, *Assistant Examiner.*